(12) United States Patent
Betts, Jr. et al.

(10) Patent No.: US 9,554,569 B2
(45) Date of Patent: Jan. 31, 2017

(54) REPELLANT SYSTEM

(71) Applicants: Billy M. Betts, Jr., Grand Prairie, TX (US); Keia J. Betts, Grand Prairie, TX (US)

(72) Inventors: Billy M. Betts, Jr., Grand Prairie, TX (US); Keia J. Betts, Grand Prairie, TX (US)

(*) Notice: Subject to any disclaimer, the term of this patent is extended or adjusted under 35 U.S.C. 154(b) by 189 days.

(21) Appl. No.: 14/637,055

(22) Filed: Mar. 3, 2015

(65) Prior Publication Data

US 2016/0255827 A1 Sep. 8, 2016

(51) Int. Cl.
*A01M 29/06* (2011.01)
*A01M 29/34* (2011.01)

(52) U.S. Cl.
CPC .............. *A01M 29/06* (2013.01); *A01M 29/34* (2013.01)

(58) Field of Classification Search
CPC ............................... A01M 29/06; A01M 29/34
USPC ...... 116/22 A; 43/132.1, 137, 142; D22/120, D22/122, 124
See application file for complete search history.

(56) References Cited

U.S. PATENT DOCUMENTS

| | | | |
|---|---|---|---|
| 577,132 A | 2/1897 | Gorman | |
| 1,617,227 A * | 2/1927 | Wik | A01M 1/24 49/60 |
| 1,631,864 A | 6/1927 | Hendrickson et al. | |
| 2,988,310 A * | 6/1961 | Wright | A45B 11/00 108/49 |
| 3,191,339 A | 6/1965 | Dougherty | |
| 3,258,200 A | 6/1966 | White | |
| 5,003,721 A * | 4/1991 | Underwood | A01M 29/34 43/132.1 |
| 5,058,314 A | 10/1991 | Frascone | |
| D328,806 S * | 8/1992 | Tucker et al. | D30/119 |
| 5,235,919 A * | 8/1993 | Robuck et al. | A01M 29/06 108/50.11 |
| 6,282,833 B1 * | 9/2001 | Dashefsky | A01M 29/06 43/125 |
| 6,941,886 B1 * | 9/2005 | Suelzer | A01M 29/06 114/343 |
| D654,979 S * | 2/2012 | Smith et al. | D22/120 |
| 8,490,325 B2 | 7/2013 | Gargiulo | |
| 9,232,782 B2 * | 1/2016 | Martinez Carrasco | A01M 29/06 |
| 2008/0222944 A1 | 9/2008 | McDonald | |

(Continued)

FOREIGN PATENT DOCUMENTS

FR 1039263 A * 10/1953 ............ A01M 29/06
JP 0645086 U * 6/1994 ............ A01M 29/34

(Continued)

*Primary Examiner* — R. A. Smith
(74) *Attorney, Agent, or Firm* — Neustel Law Offices; Michael S. Neustel

(57) ABSTRACT

A repellant system for repelling nuisances such as insects from an area around a surface such as a table. The repellant system generally includes a base, a first receiver extending from the base, a first linkage frictionally adjustable within the first receiver, a second receiver adjustably connected to the first linkage, and a second linkage frictionally adjustable within the second receiver. A motor in the base may be utilized for automated rotation of the first receiver on the base. An adjustment connector links the first linkage with the second receiver. A pair of mounts on the second receiver and second linkage removably retains a sheet roller which dispenses a sheet which will deter insects and other nuisances.

20 Claims, 22 Drawing Sheets

(56) References Cited

U.S. PATENT DOCUMENTS

2013/0067798 A1    3/2013    Keltner
2013/0075488 A1*  3/2013    Palermo ................ A01M 29/06
                                                                                       239/34

FOREIGN PATENT DOCUMENTS

| JP | 2884217 B2 | * | 4/1999 | ............ A01M 29/06 |
| JP | 2014057566 A | * | 4/2014 | ............ A01M 29/06 |
| KR | 20130009093 A | * | 1/2013 | ............ A01M 29/06 |

* cited by examiner

REPELLANT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to a repellant device and more specifically it relates to a repellant system for repelling nuisances such as insects from an area around a surface such as a table.

Description of the Related Art

Any discussion of the related art throughout the specification should in no way be considered as an admission that such related art is widely known or forms part of common general knowledge in the field.

Nuisances such as insects are common in outdoor settings. For example, when camping or enjoying a meal on an outdoor deck, gnats, flies, bees, and the like can ruin an otherwise peaceful experience. The buzzing sound of insects can disturb the serenity typical of such outdoor settings. Additionally, insects raise concerns relating to health when they are repeatedly landing on food or beverages and then flying away.

Because of the inherent problems with the related art, there is a need for a new and improved repellant system for repelling nuisances such as insects from an area around a surface such as a table.

BRIEF SUMMARY OF THE INVENTION

The invention generally relates to a repellant device which includes a base, a first receiver extending from the base, a first linkage frictionally adjustable within the first receiver, a second receiver adjustably connected to the first linkage, and a second linkage frictionally adjustable within the second receiver. A motor in the base may be utilized for automated rotation of the first receiver on the base. An adjustment connector links the first linkage with the second receiver. A pair of mounts on the second receiver and second linkage removably retain a sheet roller which dispenses a sheet which will deter insects and other nuisances.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
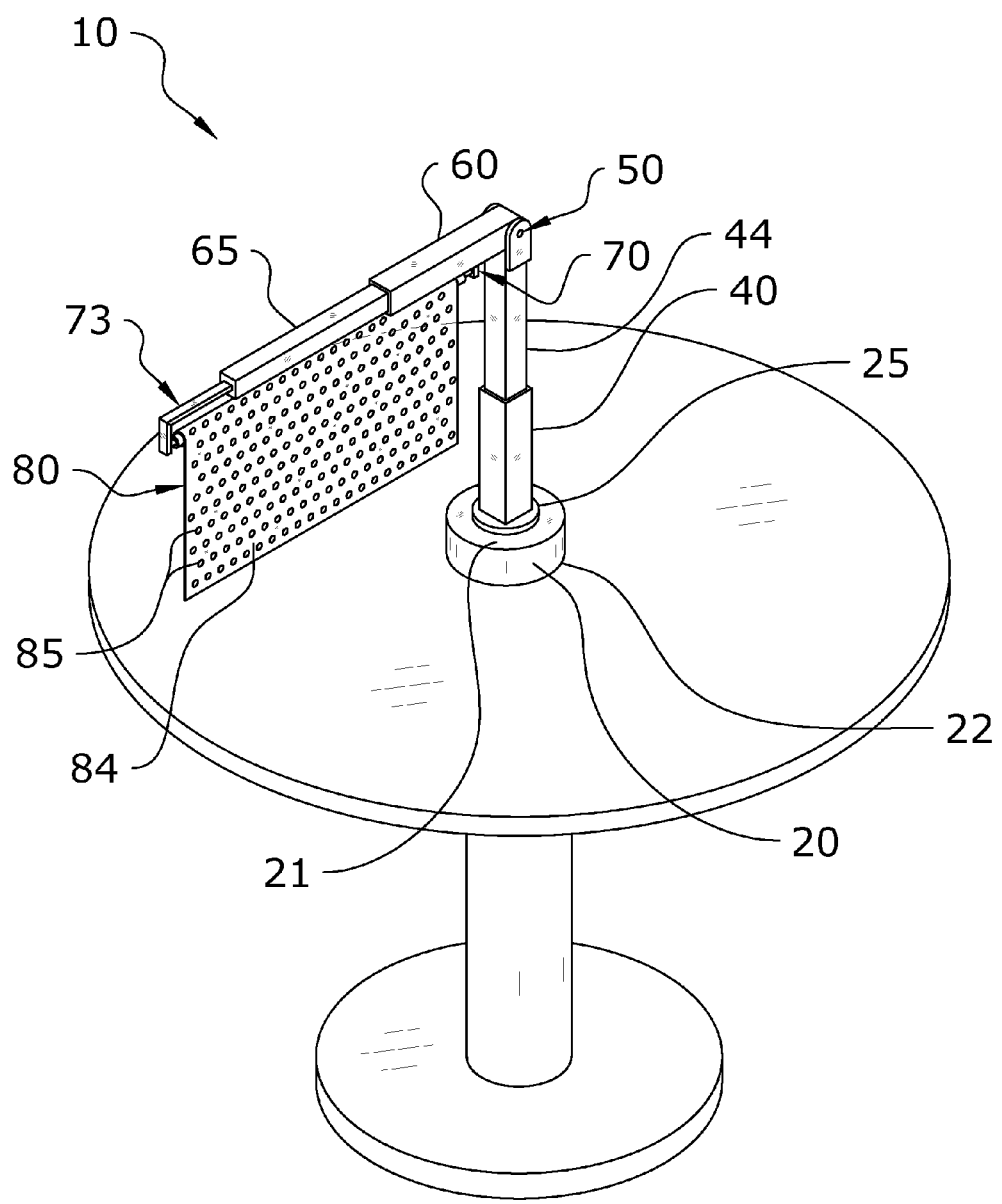
FIG. 1 is an upper perspective view of the present invention.
Figure 2:
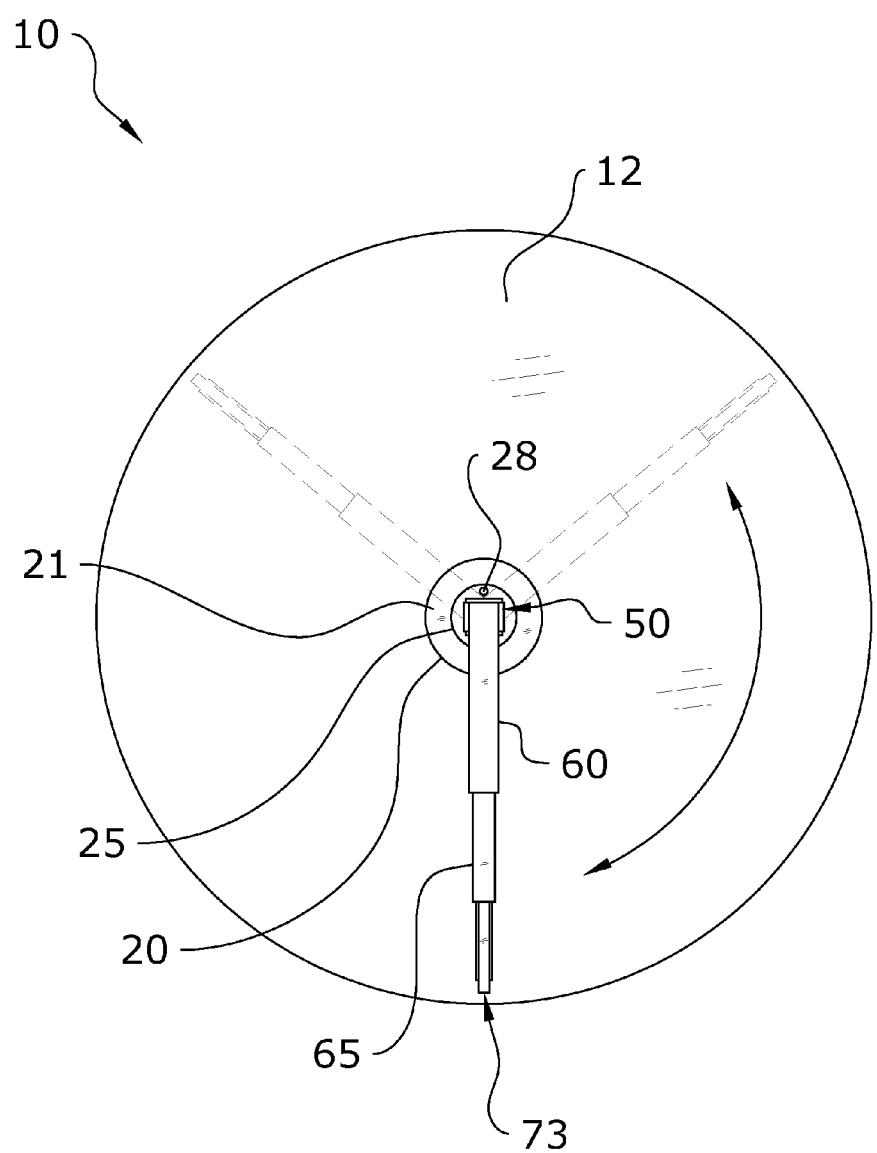
FIG. 2 is a top view illustrating rotation of the first receiver about the base.

A. Overview.

Turning now descriptively to the drawings, in which similar reference characters denote similar elements throughout the several views, FIGS. 1 through 22 illustrate a repellant system 10, which comprises a base 20, a first receiver 40 extending from the base 20, a first linkage 44 frictionally adjustable within the first receiver 40, a second receiver 60 adjustably connected to the first linkage 44, and a second linkage 65 frictionally adjustable within the second receiver 60. A motor 24 in the base 20 may be utilized for automated rotation of the first receiver 40 on the base 20. An adjustment connector 50 links the first linkage 44 with the second receiver 60. A pair of mounts 70, 73 on the second receiver 60 and second linkage 65 removably retain a sheet roller 80 which dispenses a sheet 84 which will deter insects and other nuisances.

B. Base.

As shown throughout the figures, the present invention includes a base 20 from which the first receiver 40 extends. The base 20 of the present invention is adapted to either rest or be removably secured to a surface such as a table 12 as shown in the figures. The figures illustrate two embodiments: a first embodiment shown in FIGS. 1-11 in which the base 20 rests on the surface and a second embodiment shown in FIGS. 12-22 in which the base 20 is secured to the surface via a clamp 30. It should be appreciated that these are merely exemplary embodiments, and thus various other configurations may be utilized for removably securing the base 20 to the surface.

The shape, size, and configuration of the base 20 may vary in different embodiments and should not be construed as limited by the exemplary figures. In the figures, an exemplary disc-shaped configuration is shown. Various other configurations may be utilized, such as but not limited to square-shaped, triangle-shaped, and the like. The base 20 may also comprise various materials, such as weighted materials to allow the base 20 to securely rest on the surface without tipping over. In some embodiments, the base 20 may include a separate weight or weights (not shown) if the material used to construct the base 20 is not heavy enough to provide stability on its own.

Figure 3:
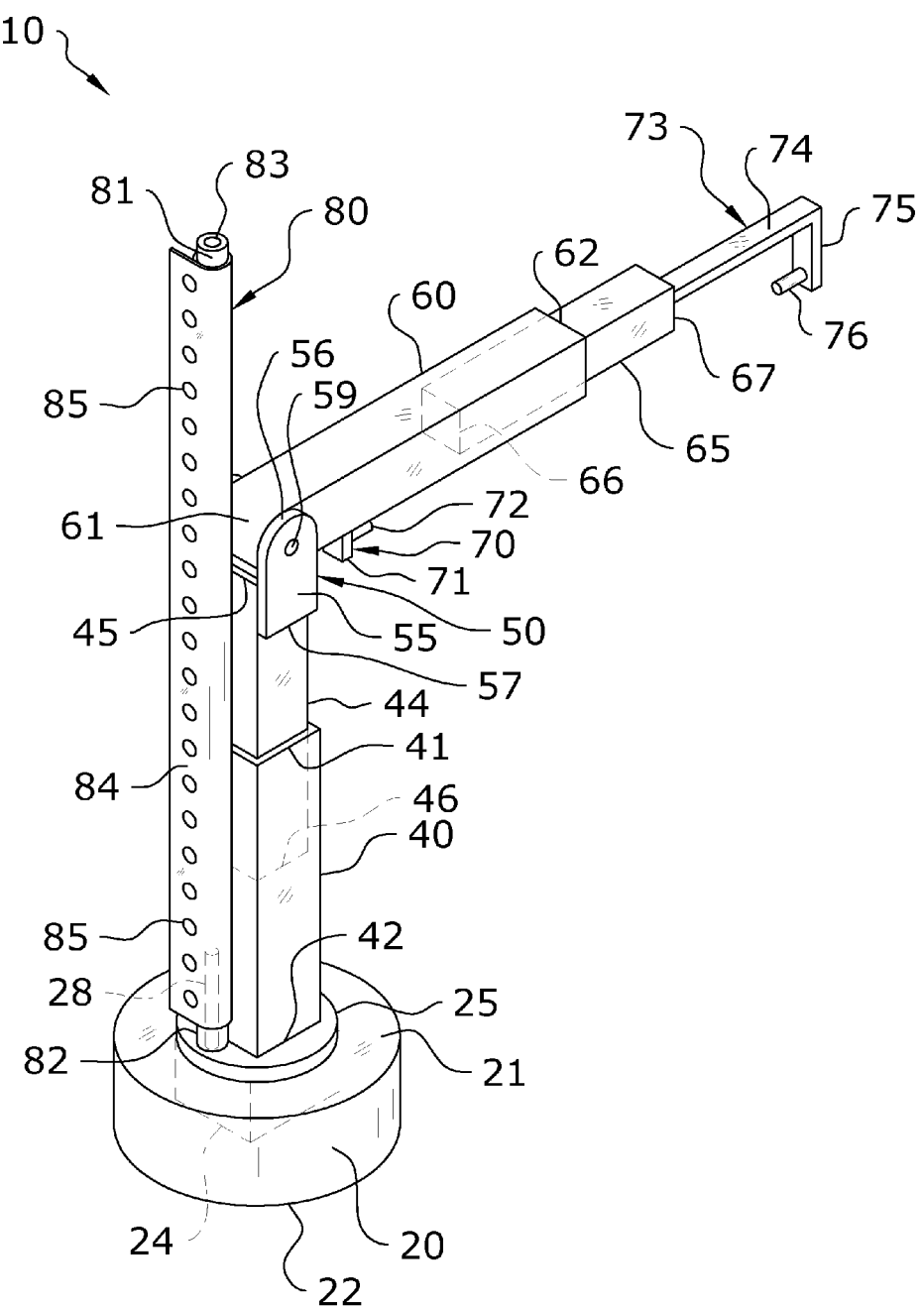
FIG. 3 is an upper perspective view of the present invention in a non-use position.

As best shown in FIG. 3, the base 20 generally includes an upper end 21 and a lower end 22. The lower end 22 of the base 20 rests against the surface on which the present invention is positioned. The first receiver 40 of the present invention extends upwardly from the upper end 21 of the base 20.

The upper end 21 of the base 20 also may include a platform 25. The platform 25 is adapted to rotate with respect to the base 20, with the first receiver 40 being fixedly secured to the platform 25 so as to rotate with the platform 25 while the base 20 remains stationary. The shape, size, and configuration of the platform 25 may vary in different embodiments of the present invention.

A motor 24 may be provided for driving rotation of the platform 25. Various types of motors 24 may be utilized, such as electric motors and the like. The motor 24 may be integrated with the present invention or, in some embodiments, may be external of the present invention and merely connected to the platform 25. In a preferred embodiment as shown in FIG. 3, the motor 24 is positioned within the base 20 to drive the platform 25.

Figure 6:
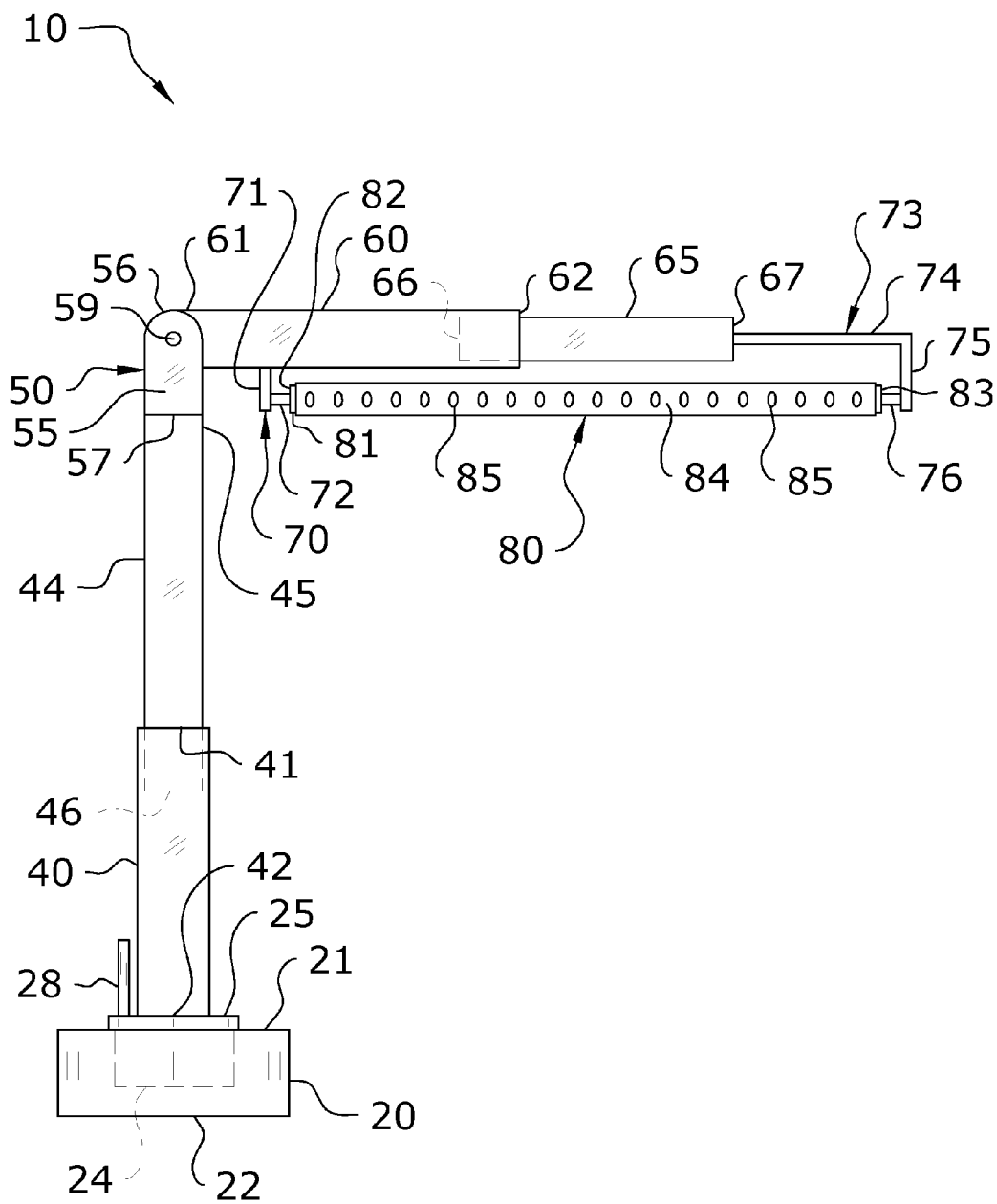
FIG. 6 is a side view of the present invention.
Figure 7:
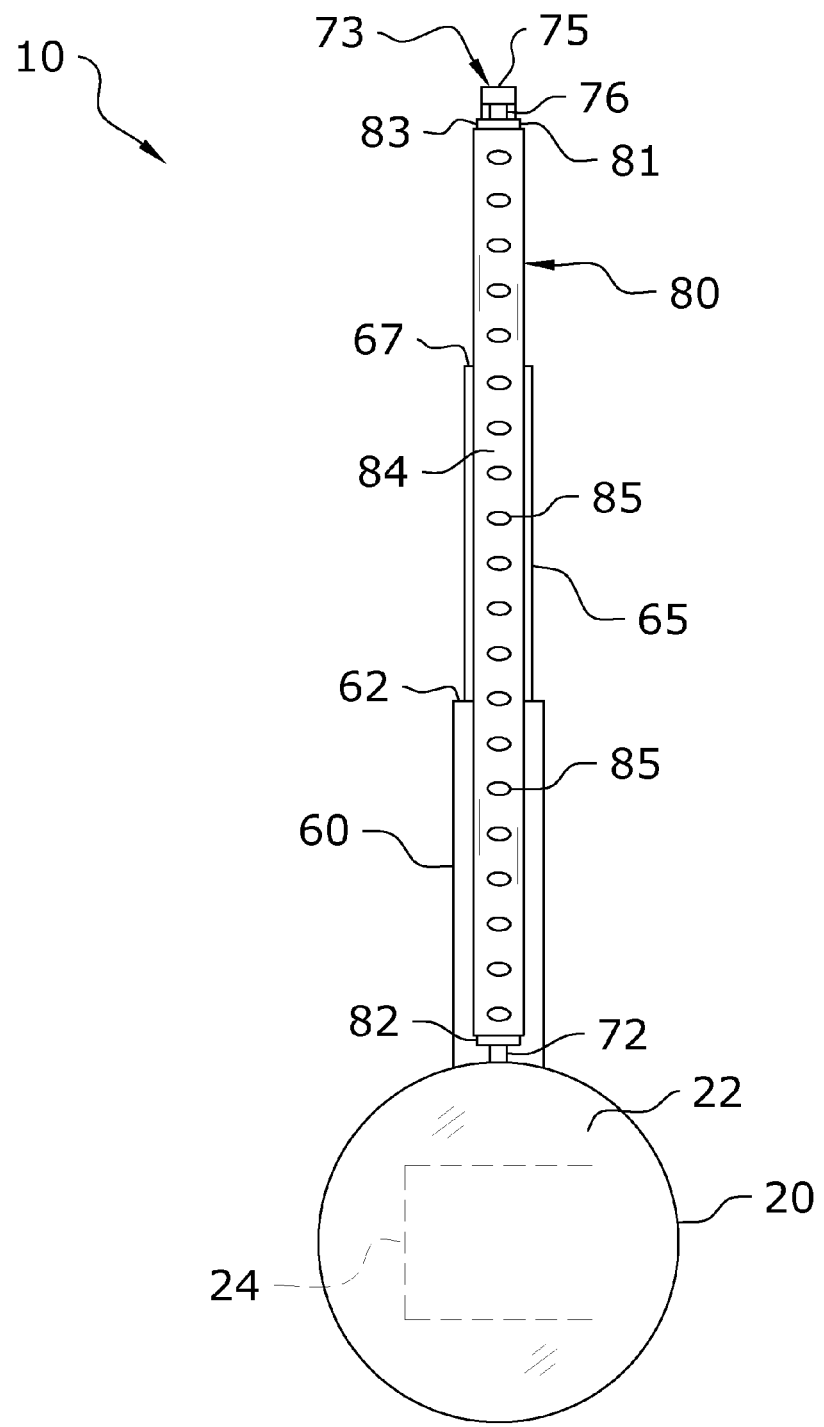
FIG. 7 is a bottom view of the present invention.

As best shown in FIG. 6, the base 20 may also include a retainer pin 28 which is adapted to removably secure the sheet roller 80 when not in use. The retainer pin 28 generally comprises a pin or other retaining structure which extends upwardly from the upper end 21 of the base 20. The retainer pin 28 will generally extend adjacent to and parallel with the first receiver 40. The retainer pin 28 will preferably not be on the platform 25, but instead directly extend from the base 20 itself.

FIGS. 12-22 illustrate an alternate embodiment of the present invention in which a clamp 30 is utilized to secure the base 20 to the edge of a surface such as a table 12. The clamp 30 may be utilized so as to keep the base 20 lighter in weight for easier transport.

Figure 14:
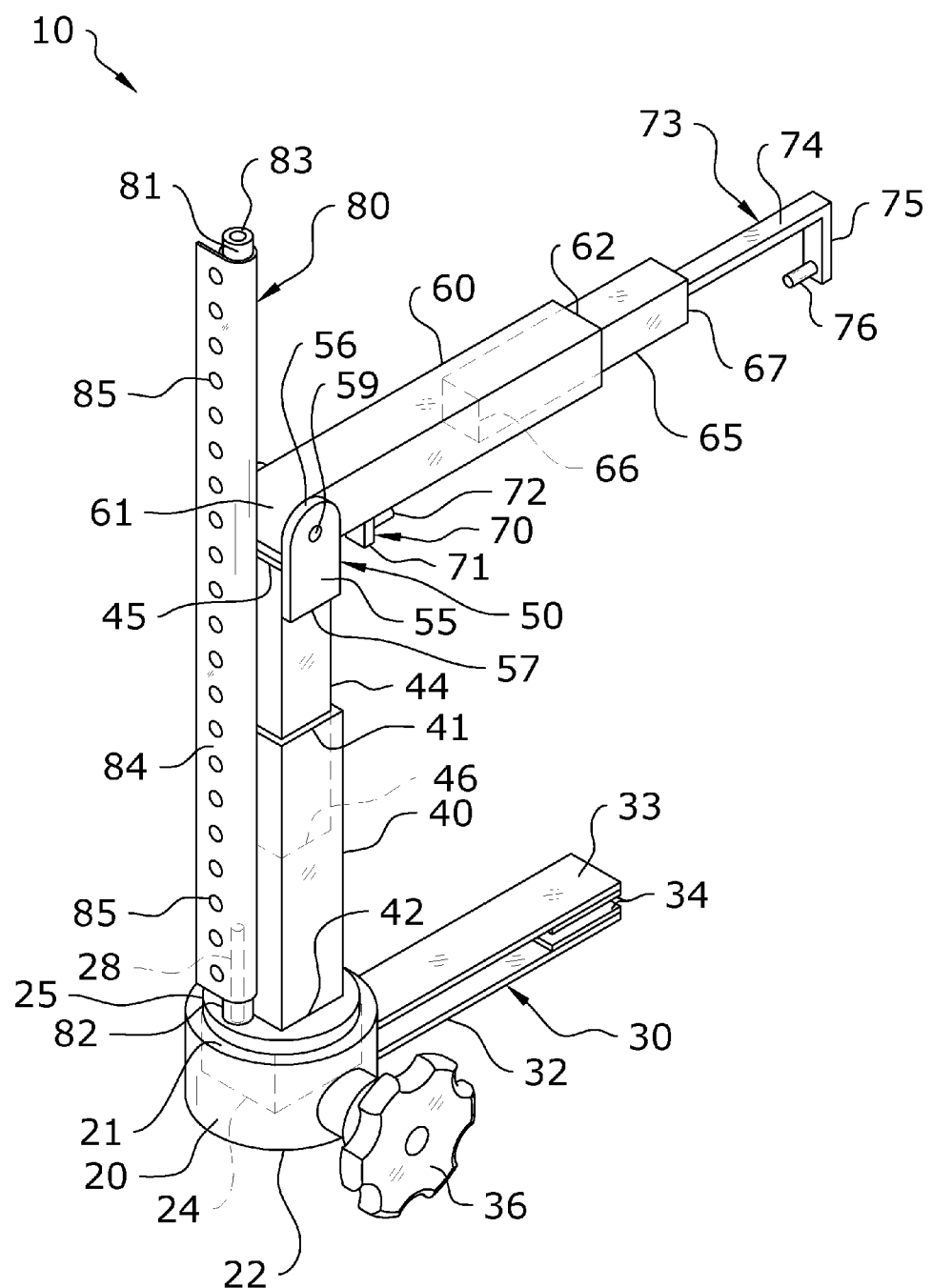
FIG. 14 is an upper perspective view of the present invention with clamp in a storage configuration.
Figure 15:
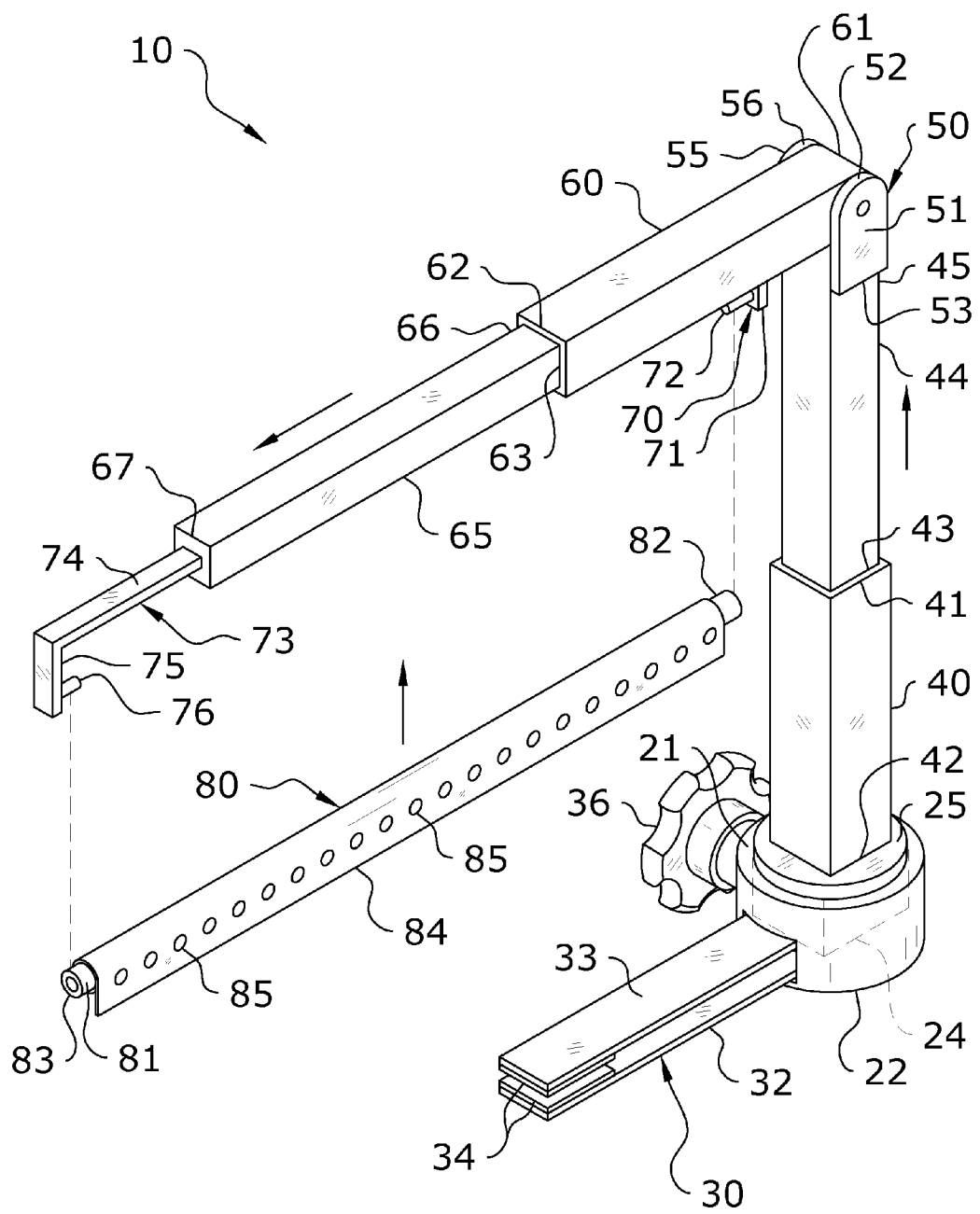
FIG. 15 is an upper perspective view of the present invention with clamp prior to use.
Figure 16:
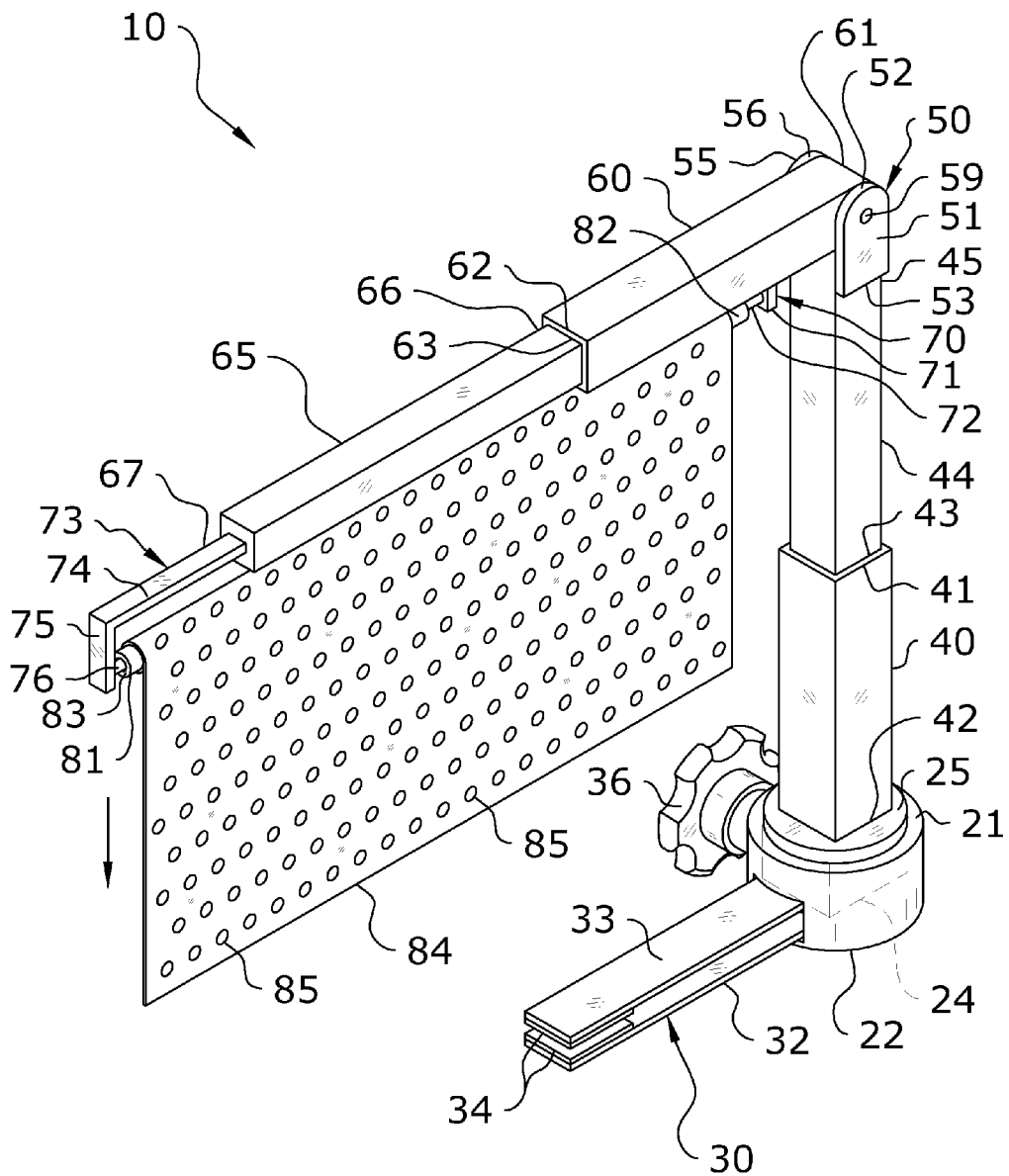
FIG. 16 is an upper perspective view of the present invention with clamp in use.
Figure 17:
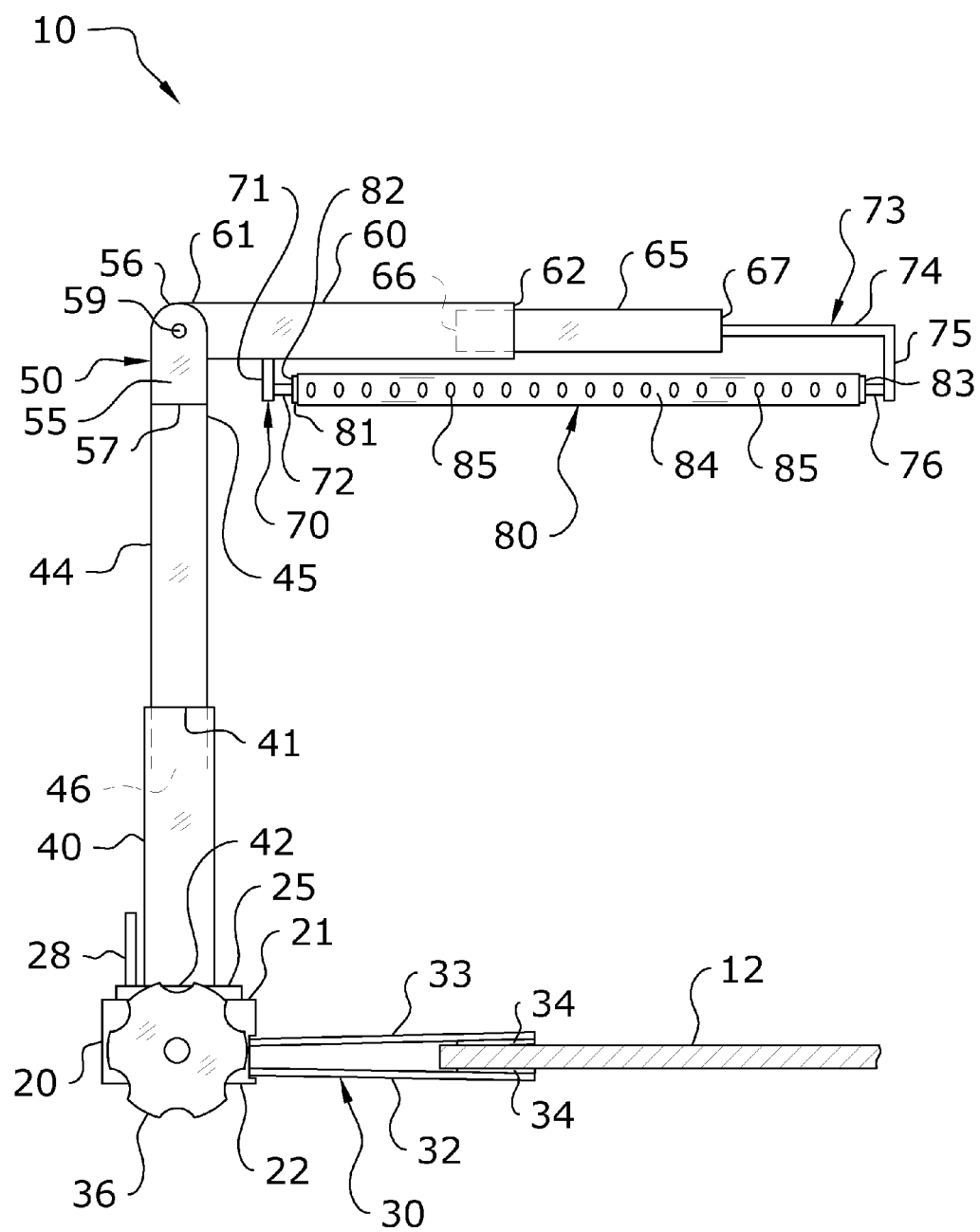
FIG. 17 is a side view of the present invention with clamp.
Figure 18:
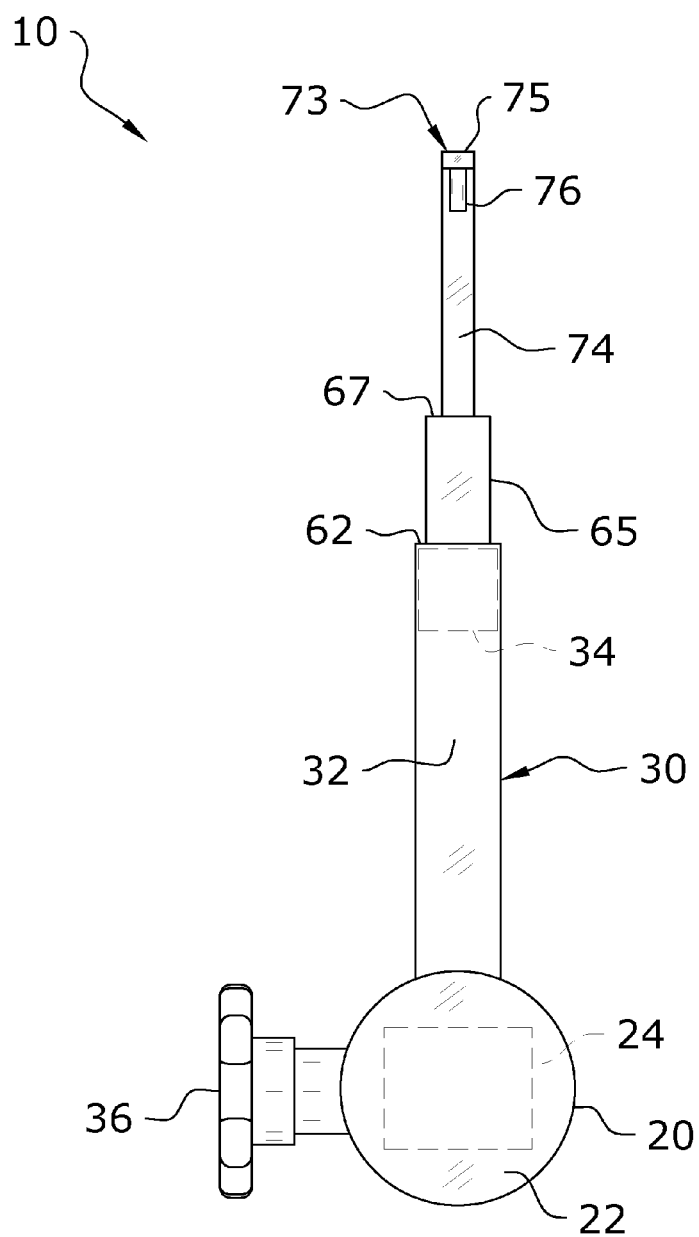
FIG. 18 is a top view of the present invention with clamp.
Figure 19:
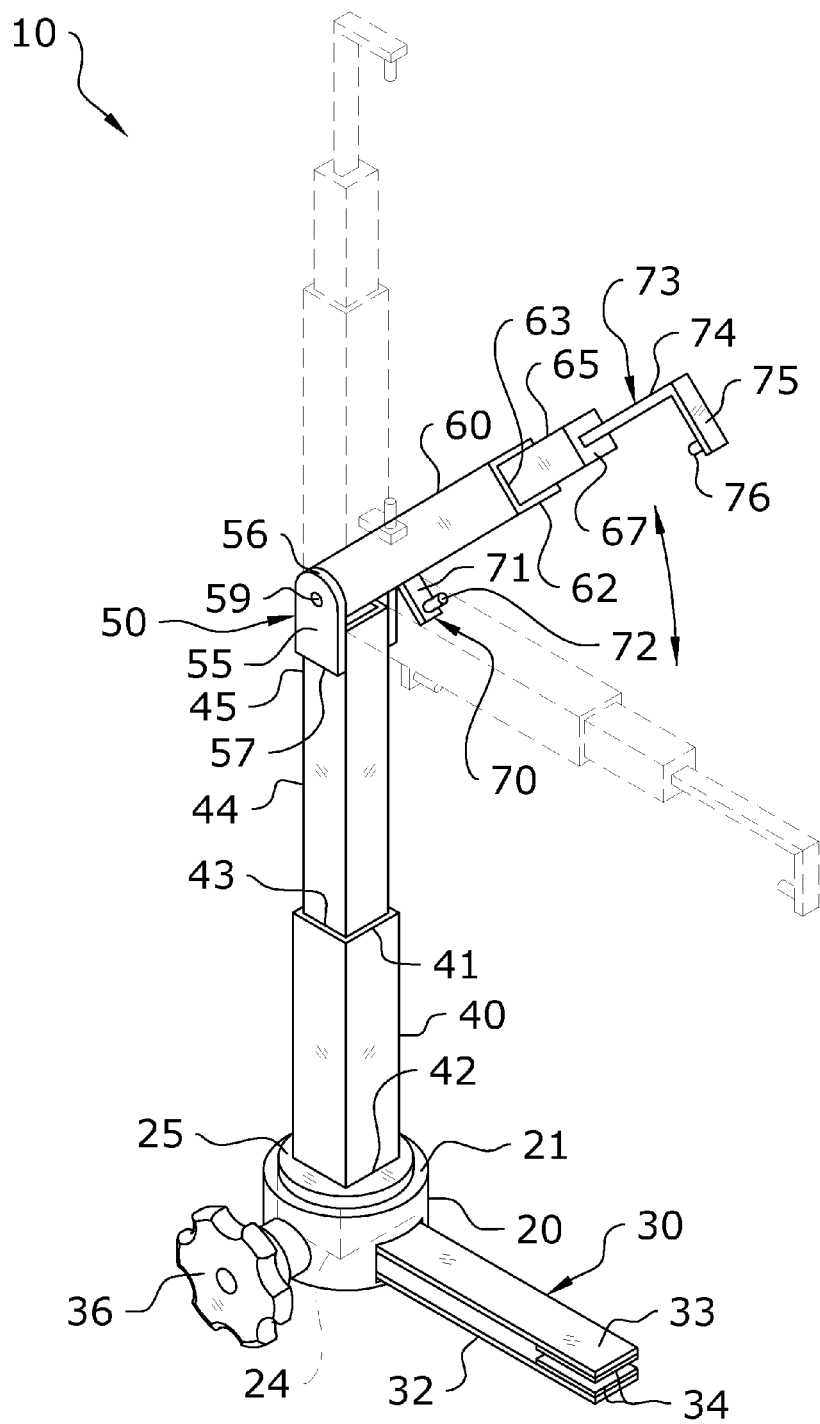
FIG. 19 is an upper perspective view of the present invention with clamp illustrating various positions of the second receiver and second linkage.
Figure 20:
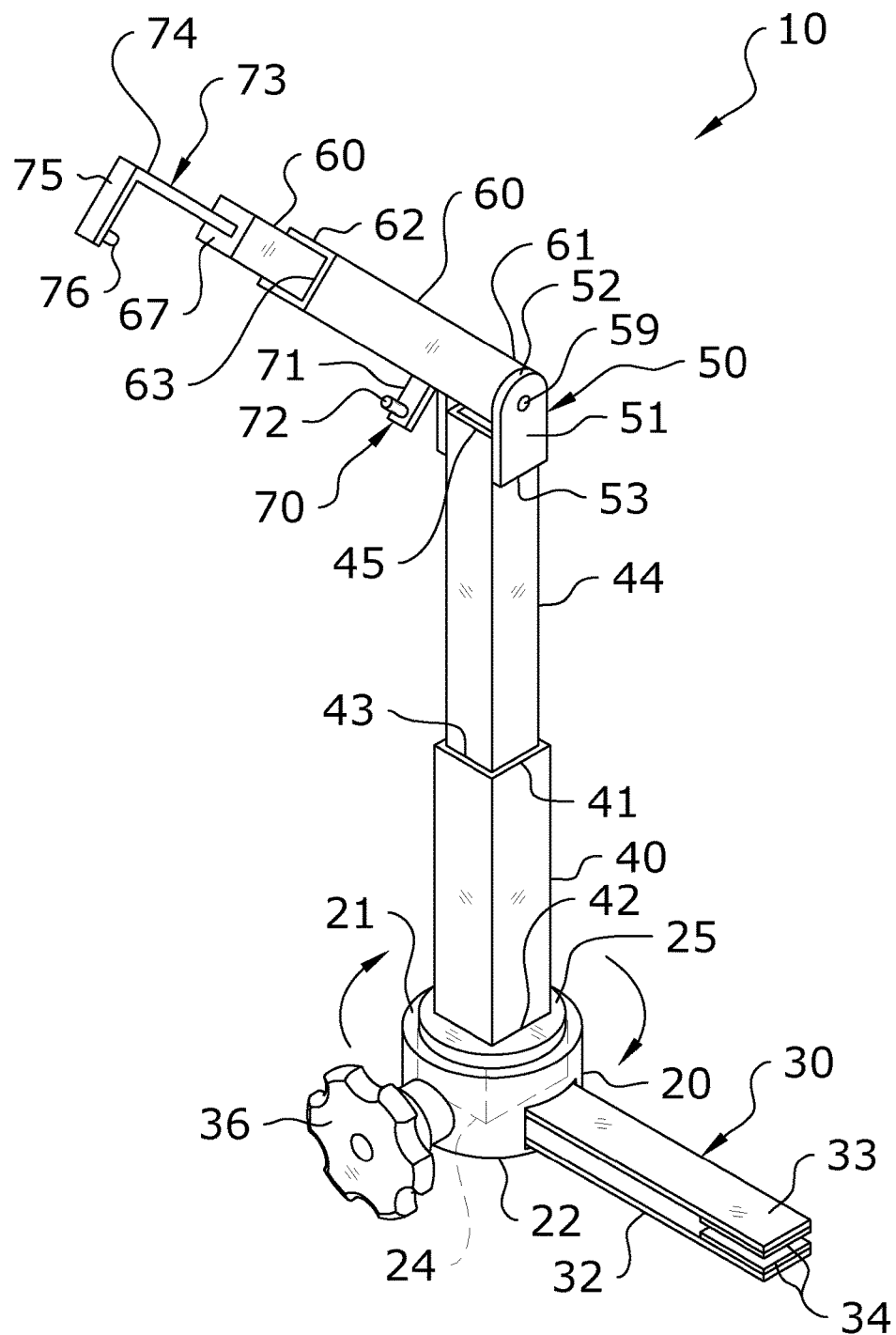
FIG. 20 is a frontal upper perspective view of the present invention with clamp in a diagonal configuration.
Figure 21:
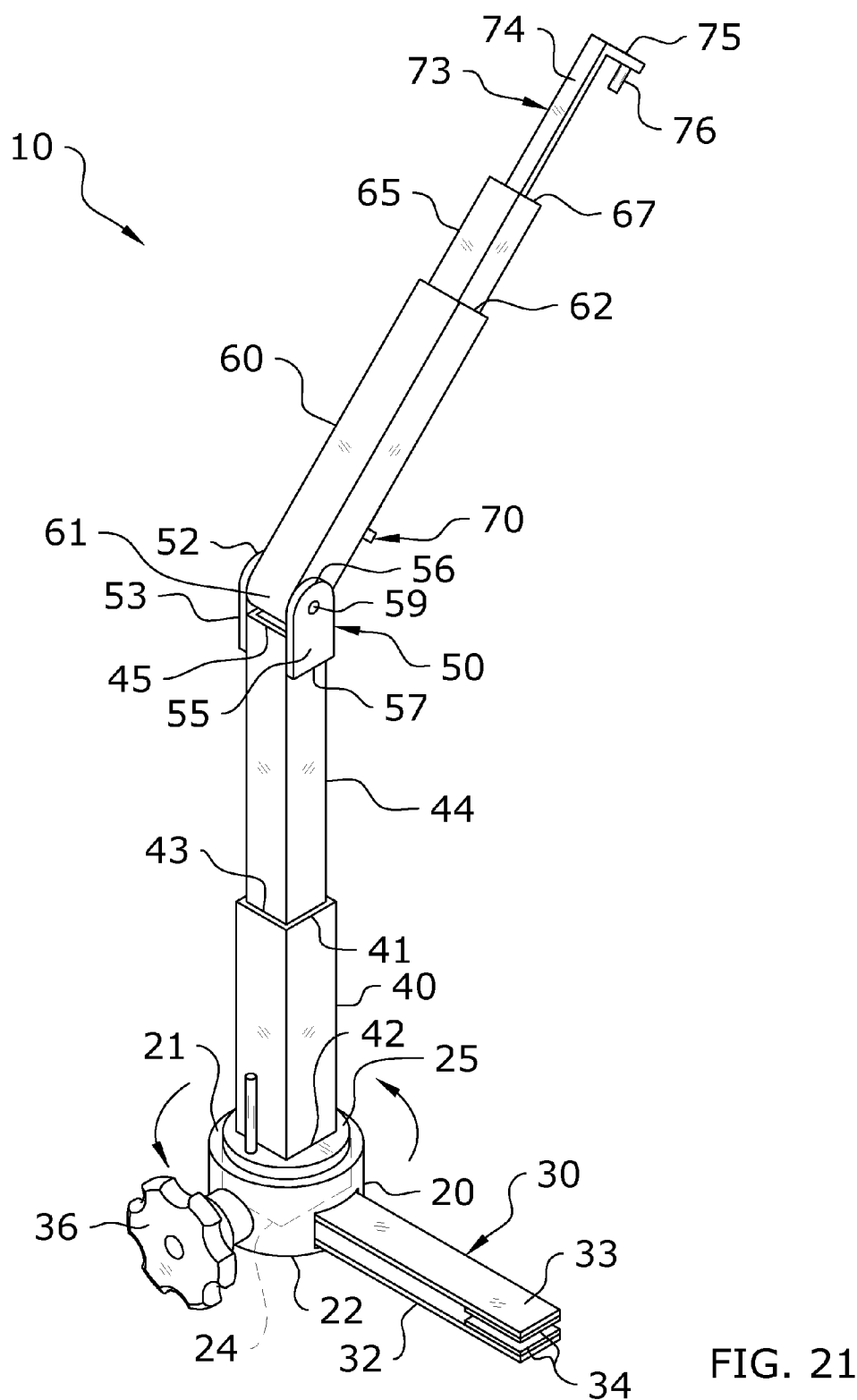
FIG. 21 is a rear upper perspective view of the present invention with clamp in a diagonal configuration.
Figure 22:
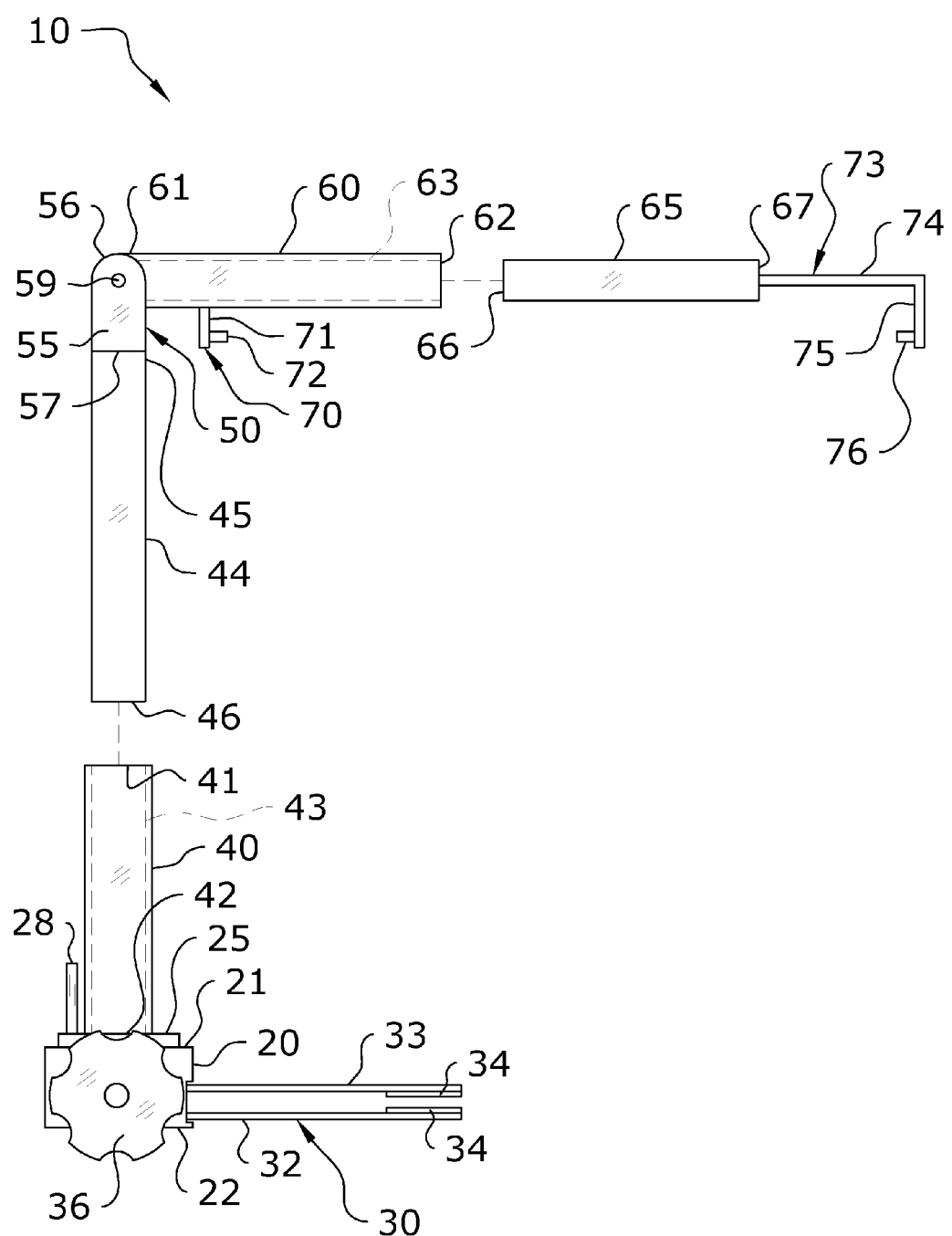
FIG. 22 is a side exploded view of the present invention with clamp.

In the alternate embodiment, the clamp 30 comprises a pair of parallel members 32, 33 which may be adjusted toward or away from each other by a knob 36. Thus, as shown in FIG. 14, a first member 32 extends outwardly from the base 20 with a second member 33 extending outwardly in a parallel direction in spaced-apart relationship with the first member 32. The distal ends of the first and second members 32, 33 may include protective members 34 so that the clamp 30 does not damage the surface. The knob 36 also extends from the base 20 and may be rotated to open or close the clamp 30.

C. First Receiver and Linkage.

As shown throughout the figures, the present invention includes a first receiver 40 which extends upwardly from the upper end 21 of the base 20. The first receiver 40 is either fixedly secured to or integrally formed with the platform 25 of the present invention such that the first receiver 40 rotates along with the platform 25 while the base 20 remains stationary.

Figure 11:
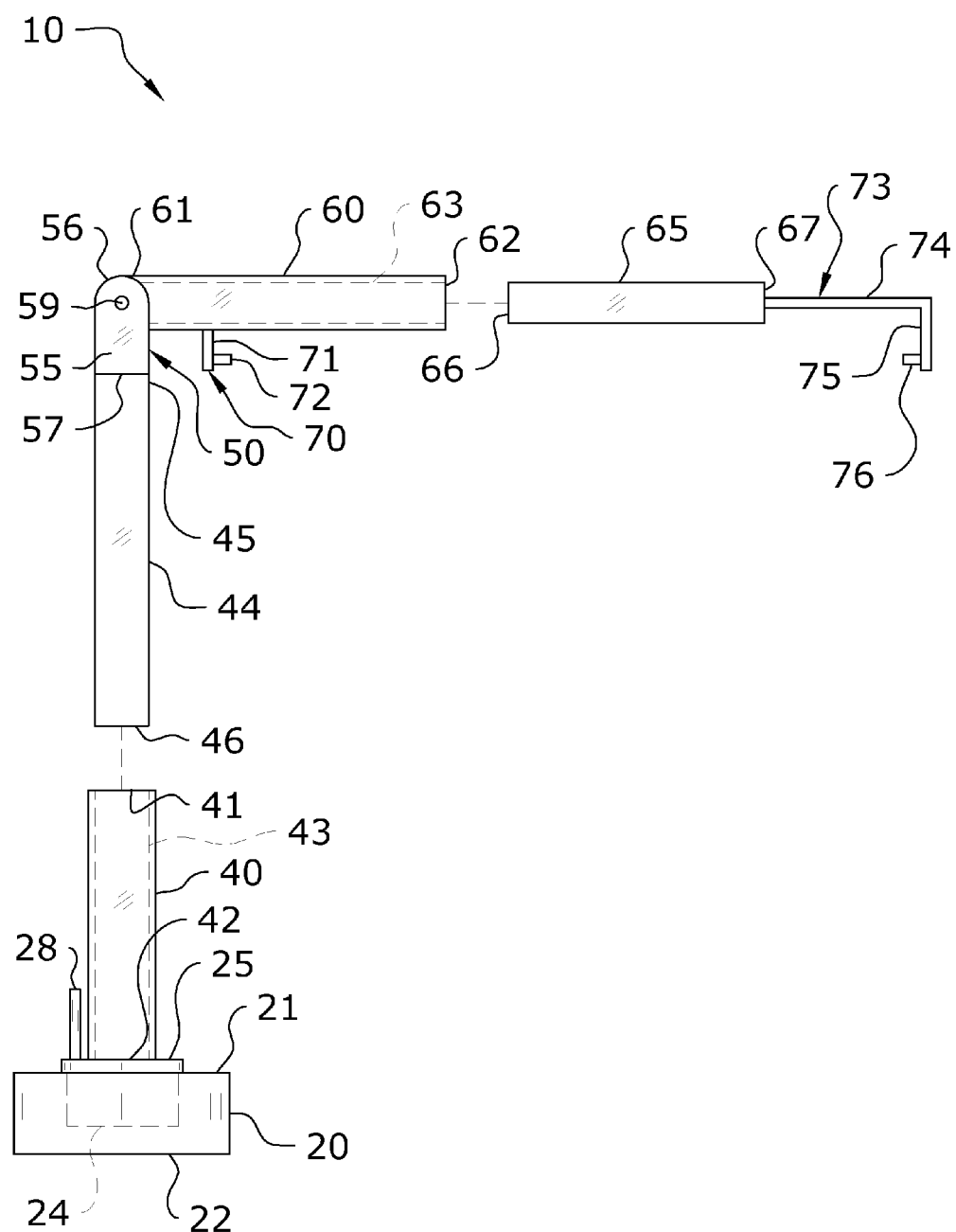
FIG. 11 is a side exploded view of the present invention.

As best shown in FIG. 11, the first receiver 40 generally comprises an elongated member having an upper end 41, a lower end 42, and an internal channel 43. The lower end 42 of the first receiver 40 is fixedly attached to or integrally formed with the platform 25 of the base 20. The upper end 41 of the first receiver 40 provides access to the channel 43 such that the first linkage 44 may frictionally fit within the channel 43 of the first receiver 40.

It should be appreciated that the first receiver 40 may comprise various configurations, sizes, and shapes. Although the figures illustrate a first receiver 40 comprising a hollow, elongated member with a square-shaped cross-section, other configurations may be utilized without impacting the overall operation of the present invention. The length of the first receiver 40 may vary for different applications of the present invention.

The first linkage 44 is frictionally and telescopically positioned within the channel 43 of the first receiver 40. The lower end 46 of the first linkage 44 is positioned within the channel 43 of the first receiver 40. The upper end 45 of the first linkage 44 includes the adjustment connector 50 of the present invention.

The first linkage 44 links the first receiver 40 with the second receiver 60 of the present invention in a height-adjustable manner. By adjusting the first linkage 44 up and down with respect to the first receiver 40, the effective height (i.e. the height of the sheet roller 80) may be adjusted.

D. Adjustment Connector.

As shown throughout the figures, an adjustment connector 50 connects the first linkage 44 with the second receiver 60 such that the second receiver 60 may adjust vertically into a plurality of positions with respect to the first linkage 44. Although the figures illustrate that the second receiver 60 may adjusted into three distinct positions (vertical, horizontal, and angled), it should be appreciated that any number of positions may be supported by the present invention.

The adjustment connector 50 will generally comprise a first connector 51 which acts in concert with a second connector 55 to allow the second receiver 60 to be rotated along a longitudinal axis. The first connector 51 is secured to or integrally formed with a first side of the upper end 45 of the first linkage 44 and the second connector 52 is secured to or integrally formed with a second side of the upper end 45 of the first linkage 44.

Figure 10:
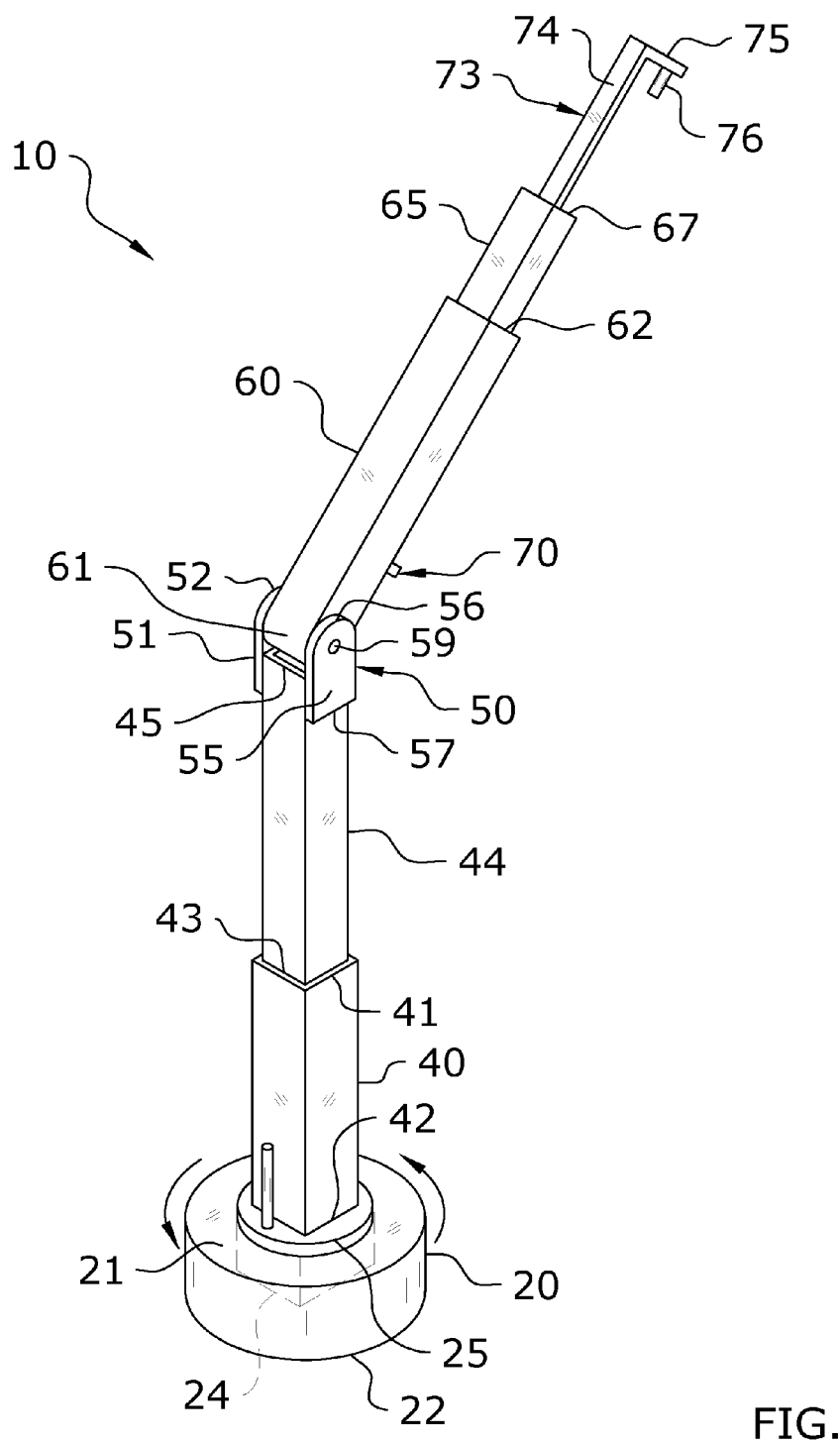
FIG. 10 is a rear upper perspective view of the present invention in a diagonal configuration.

The first connector 51 includes an upper end 52 and a lower end 53 as shown in FIG. 10. The upper end 52 of the first connector 51 extends for a distance above the upper end 45 of the first linkage 44. The lower end 53 of the first connector 51 is fixedly secured to or integrally formed with the first side of the first linkage 44 adjacent to its upper end 45.

The second connector 55 similarly includes an upper end 52 and a lower end 53 as shown in FIG. 10. The upper end 56 of the second connector 55 extends for a distance above the upper end 45 of the first linkage 44 in parallel relationship with the first connector 51. The lower end 57 of the second connector 55 is fixedly secured to or integrally formed with the second side of the first linkage 44 adjacent to its upper end 45.

The first and second connector 51, 55 together form the adjustment connector 50 of the present invention. The first and second connectors 51, 55 are in parallel, spaced-apart relationship with each other. An adjustment pin 59 extends between the first and second connectors 51, 55. The first end 61 of the second receiver 60 is rotatably secured around the adjustment pin 59 so that the second receiver 60 may adjust into a plurality of positions with respect to the first linkage 44.

E. Second Receiver and Linkage.

As shown throughout the figures, the present invention includes a second receiver 60 which extends outwardly from the adjustment connector 50. The second receiver 60 adjusts along a longitudinal axis with respect to the first linkage 44 as shown in the figures. Thus, the adjustment pin 59 extends through the second receiver 60 so that the second receiver 60 may rotate around the adjustment pin 59.

As best shown in FIG. 11, the second receiver 60 generally comprises an elongated member having a first end 61, a second end 62, and an internal channel 63. The first end 61 of the second receiver 60 is secured between the first and second connectors 51, 55 of the adjustment connector 50 by the adjustment pin 59. The second end 62 of the second receiver 60 provides access to the channel 63 such that the second linkage 65 may frictionally fit within the channel 63 of the second receiver 60.

It should be appreciated that the second receiver 60 may comprise various configurations, sizes, and shapes. Although the figures illustrate a second receiver 60 comprised of a hollow, elongated member with a square-shaped cross-section, other configurations may be utilized without impacting the overall operation of the present invention. The length of the second receiver 60 may vary for different applications of the present invention.

The second linkage 65 is frictionally and telescopically positioned within the channel 63 of the second receiver 60. The first end 66 of the second linkage 65 is frictionally secured within the channel 63 of the second receiver 60 so that the second linkage 65 may be extended out of or retracted back into the second receiver 60. The second end 67 of the second linkage 65 includes the second mount 73 of the present invention. The second linkage 65 is adjustable into and out of the second receiver 60. The second linkage 65 is extended outwardly when the sheet roller 80 is in use and is retracted inwardly when the sheet roller 80 is not in use.

F. Mounts.

As best shown in FIG. 11, the present invention includes a pair of mounts 70, 73 between which the sheet roller 80 of the present invention may be removably connected. The first mount 70 will preferably extend downwardly from a position on second receiver 60. The first mount 70 will generally comprise a first base 71 which extends in a first direction and a first pin 72 which extends perpendicularly with respect to the first base 71. The first end 82 of the roller tube 81 is rotatably secured around the first pin 72 when the present invention is in use.

The second mount 73 extends outwardly from the second end 67 of the second linkage 65 to removably receive the second end 83 of the sheet roller 80. The second mount 73 generally comprises a horizontal portion 74 extending outwardly from the second end 67 of the second linkage 65.

A vertical portion 75 extends downwardly from the distal end of the horizontal portion 74 as shown in FIG. 11. To receive the sheet roller 80, a second pin 76 extends inwardly from the vertical portion 75 of the second mount 73. The second pin 76 is aligned with the first pin 72 so that the roller tube 81 may be secured between the two pins 72, 76 in a level manner.

G. Sheet Roller.

The present invention includes a sheet roller 80 which may be used to extend or retract a sheet 84 which aids in repelling various nuisances, such as insects and the like. The sheet roller 80 includes an internal roller tube 81 having a first end 82 and a second end 83. When not in use, either end 82, 83 of the roller tube 81 may be mounted to the retainer pin 28 of the base 20. In such a position, the sheet roller 80 will extend parallel with the first receiver 40 awaiting use.

When in use, the first end 82 of the roller tube 81 is secured to the first pin 72 of the first mount 70 and the second end 83 of the roller tube 81 is secured to the second pin 76 of the second mount 73 so that the roller tube 81 extends between the two pins 72, 76 as shown in FIG. 6. The roller tube 81 is rotatably secured between the two pins 72, 76 so that the roller tube 81 may be rotated in a first direction to dispense the sheet 84 and in a second direction to retract the sheet 84.

The sheet 84 of the present invention is rolled upon the roller tube 81 and may be dispensed by rotating the roller tube 81 about the pins 72, 76 in a first direction and refracted by rotating the roller tube 81 about the pins 72, 76 in a second direction. The sheet 84 will generally comprise plastic, though other materials may be utilized. The sheet 84 may comprise a rectangular-shape as shown or various other shapes may be utilized. The sheet 84 will preferably include a plurality of sheet apertures 85 so as to allow airflow through the sheet 84 and to provide transparency so that the sheet can be seen through, such as when the sheet 84 material is opaque.

H. Operation of Preferred Embodiment.

In use, the present invention is first secured to a surface such as a table 12 as shown in the figures. The present invention may be secured to the surface by at least two methods. Using the first method such as shown in FIG. 1, the weight of the base 20 alone will retain the present invention on the surface without tipping over.

Figure 12:
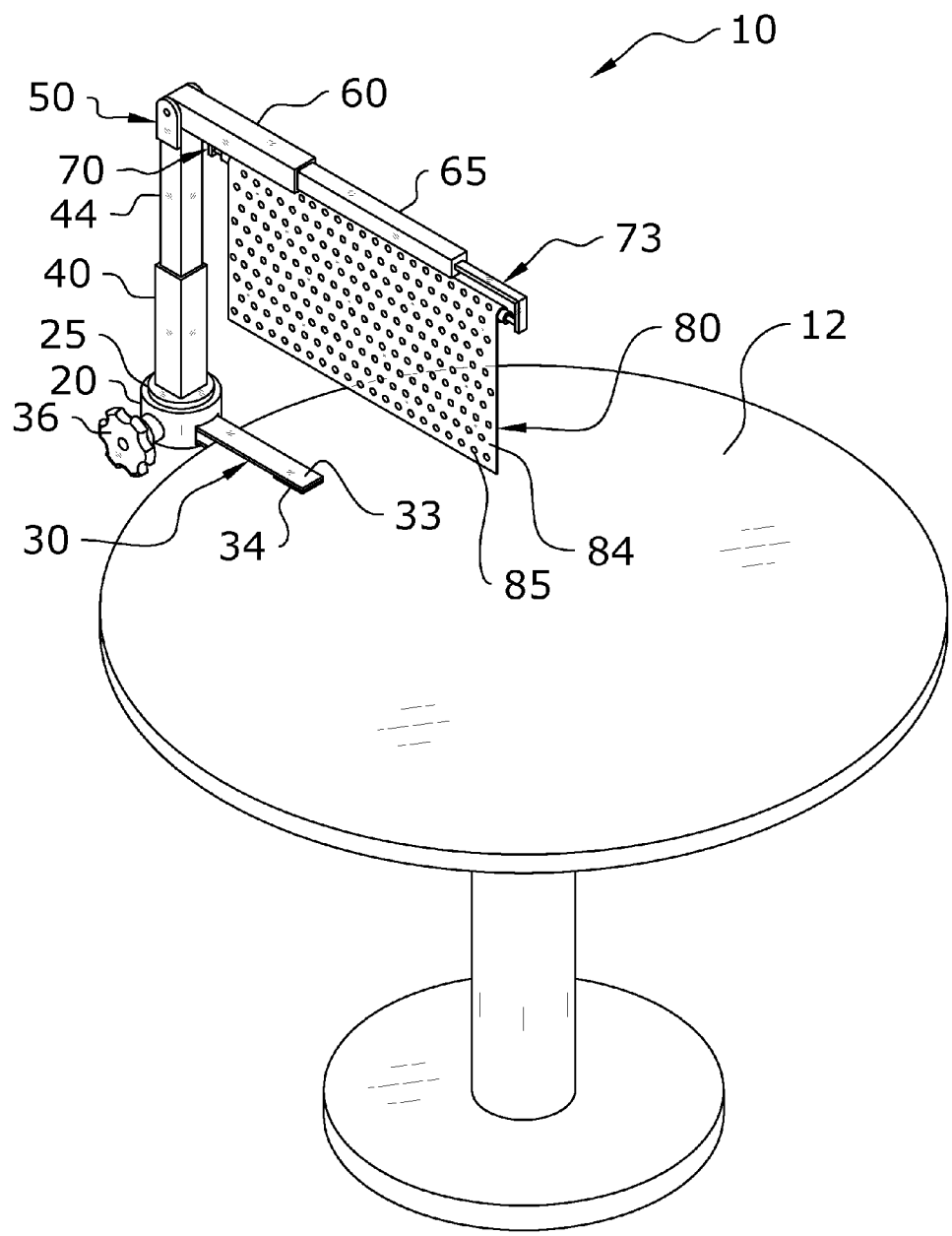
FIG. 12 is an upper perspective view of the present invention clamped to a table.
Figure 13:
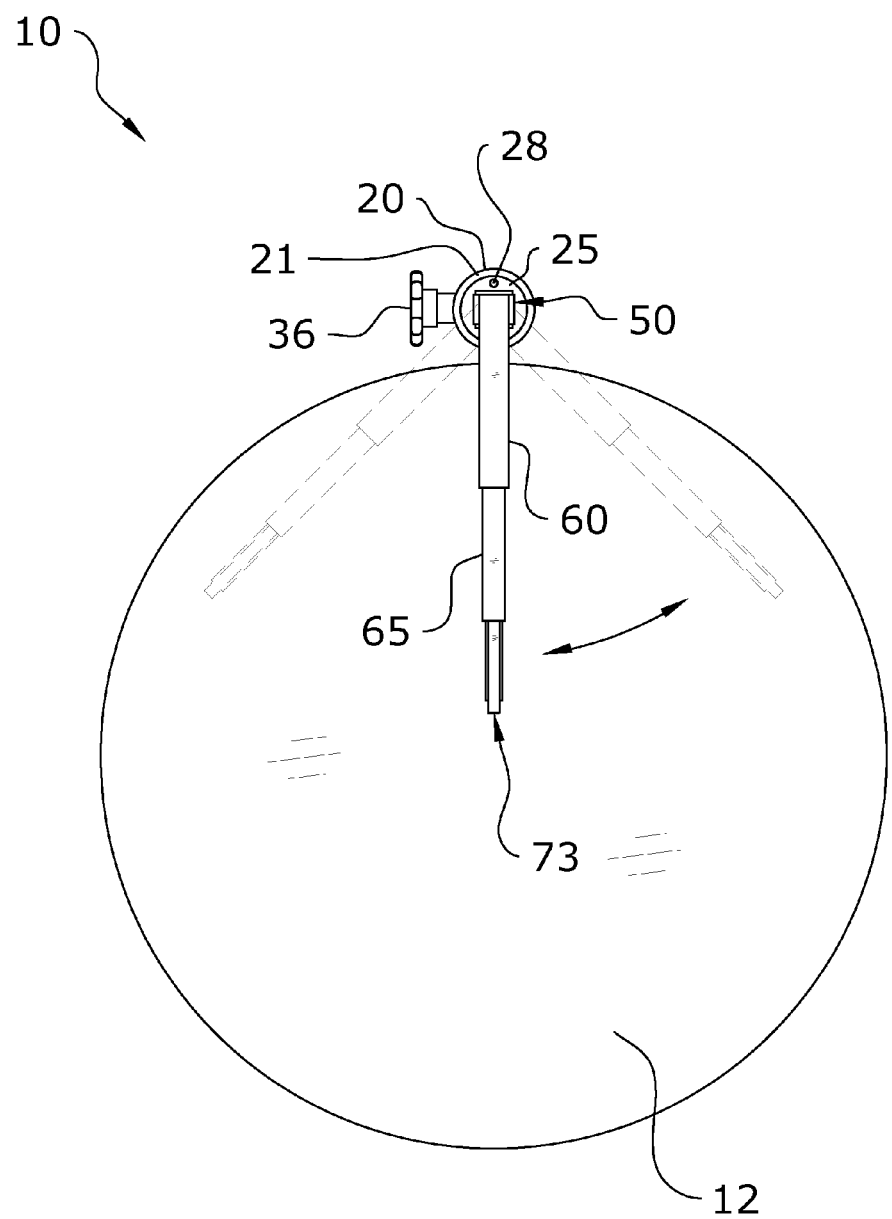
FIG. 13 is a top view of the present invention clamped to a table illustrating rotational movement of the first receiver.

Using the second method such as shown in FIG. 12, the clamp 30 of the present invention is used to secure the base 20 to the surface. In such an embodiment, the edge of the surface such as a table 12 edge is positioned between the first member 32 and the second member 33 of the clamp 30. The knob 36 is then adjusted in a first direction to tighten the clamp 30 by forcing the first and second members 32, 33 toward each other to be secured against the surface. When it is desired to remove the present invention from the surface, the knob 36 may be adjusted in a second direction to loosen the clamp 30 by forcing the first and second members 32, 33 away from each other to release the surface.

With the base 20 secured to the surface, the present invention may be adjusted for use. First, the first linkage 44 may be adjusted within the first receiver 40 to the appropriate height. The desired height will be dependent on a number of factors, such as the setting as well as any objects (such as a meal) which are present on the surface. The frictional engagement between the first linkage 44 and the first receiver 40 will retain the desired height absent the application of force.

Figure 4:
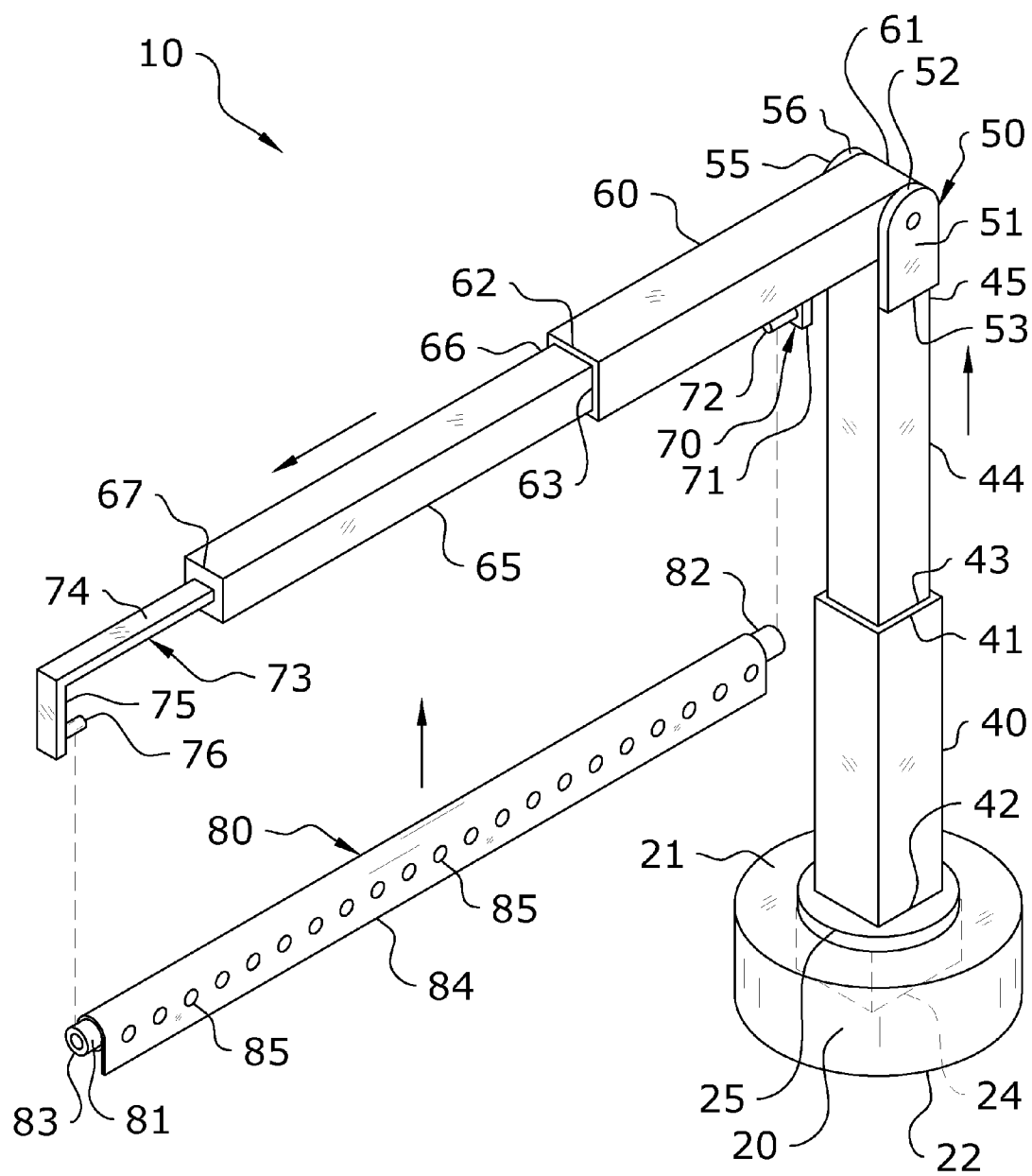
FIG. 4 is an upper perspective view of the present invention with the second receiver and second linkage extended.

With the proper height selected, the second linkage 65 may be adjusted outwardly from the second receiver 60 so that the sheet roller 80 may be installed. The second linkage 65 is pulled out from the second receiver 60 to the desired length such as shown in FIGS. 3 and 4. Frictional engagement between the second linkage 65 and the second receiver 60 retains the second linkage 65 in positioned absent the application of force.

Figure 5:
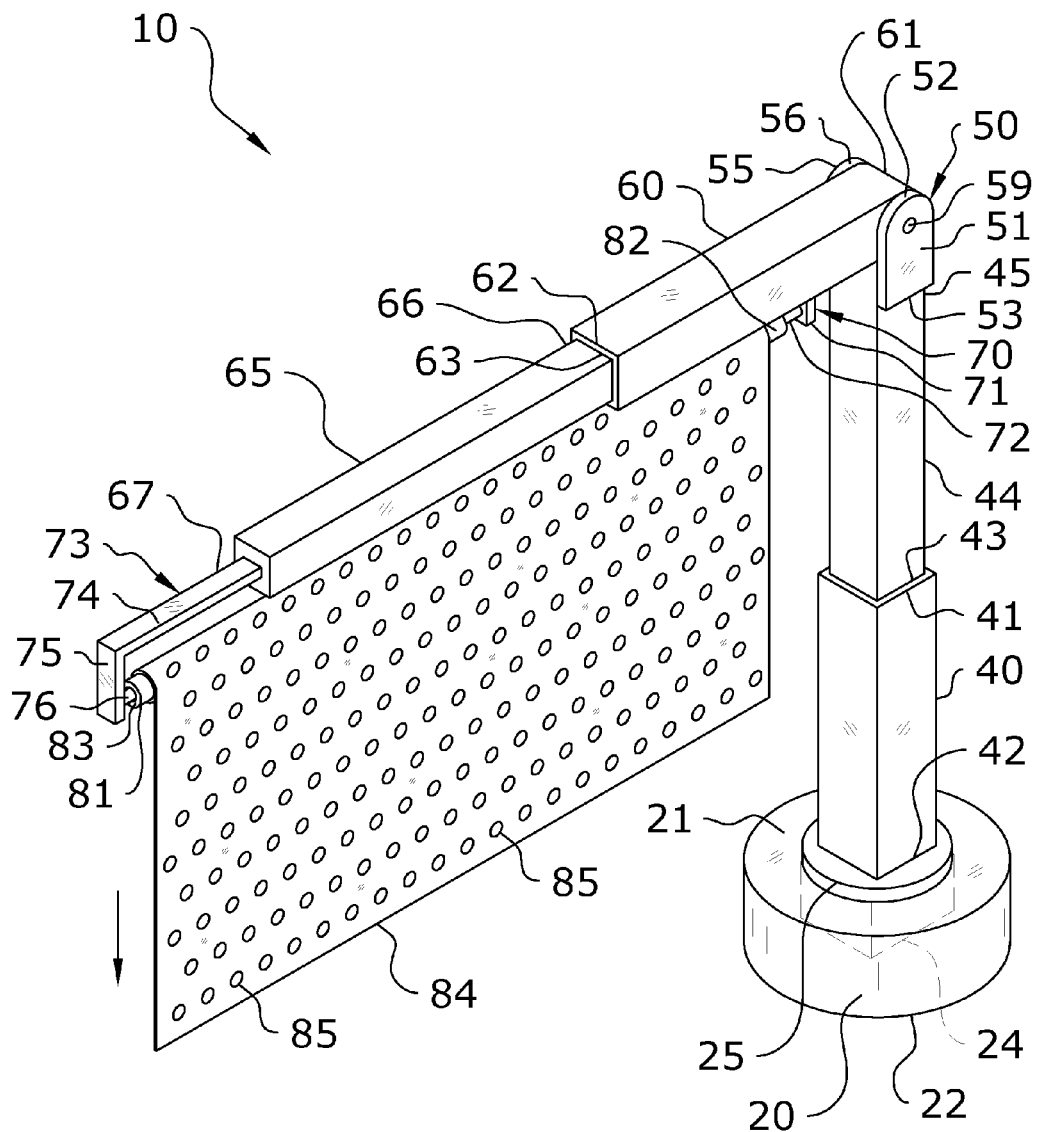
FIG. 5 is an upper perspective view of the present invention with the sheet rolled down.

With the second linkage 65 extracted, the sheet roller 80 may be removably secured between the two mounts 70, 73. The sheet roller 80 is first removed from the retainer pin 28 of the base 20. The first end 82 of the roller tube 81 is rotatably secured around the first pin 72 and the second end 83 of the roller tube 81 is rotatably secured around the second pin 76 as shown in FIG. 6. The sheet 84 may then be drawn down to the desired length as shown in FIG. 5.

Figure 8:
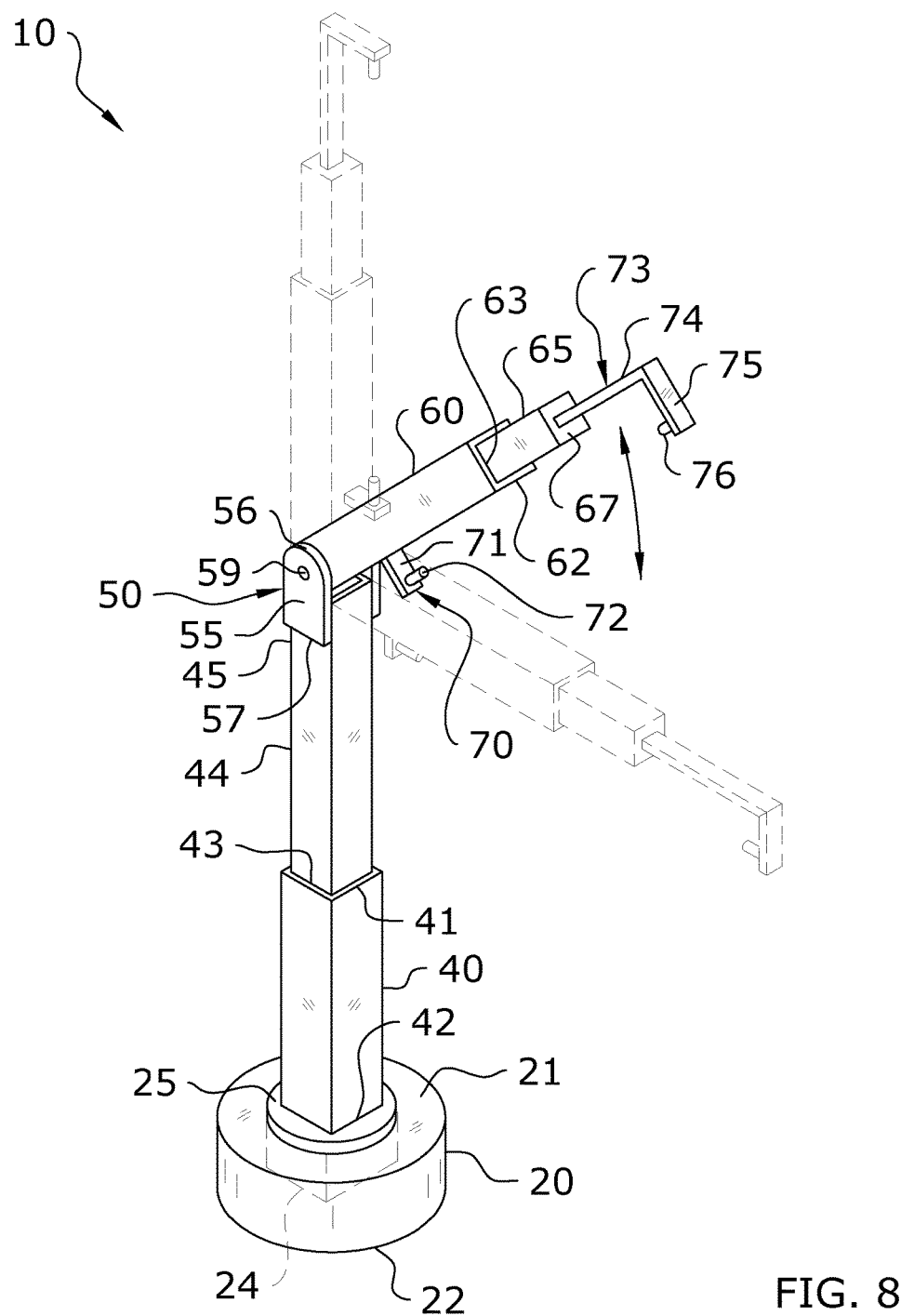
FIG. 8 is an upper perspective view of the present invention illustrating various positions of the second receiver and second linkage.
Figure 9:
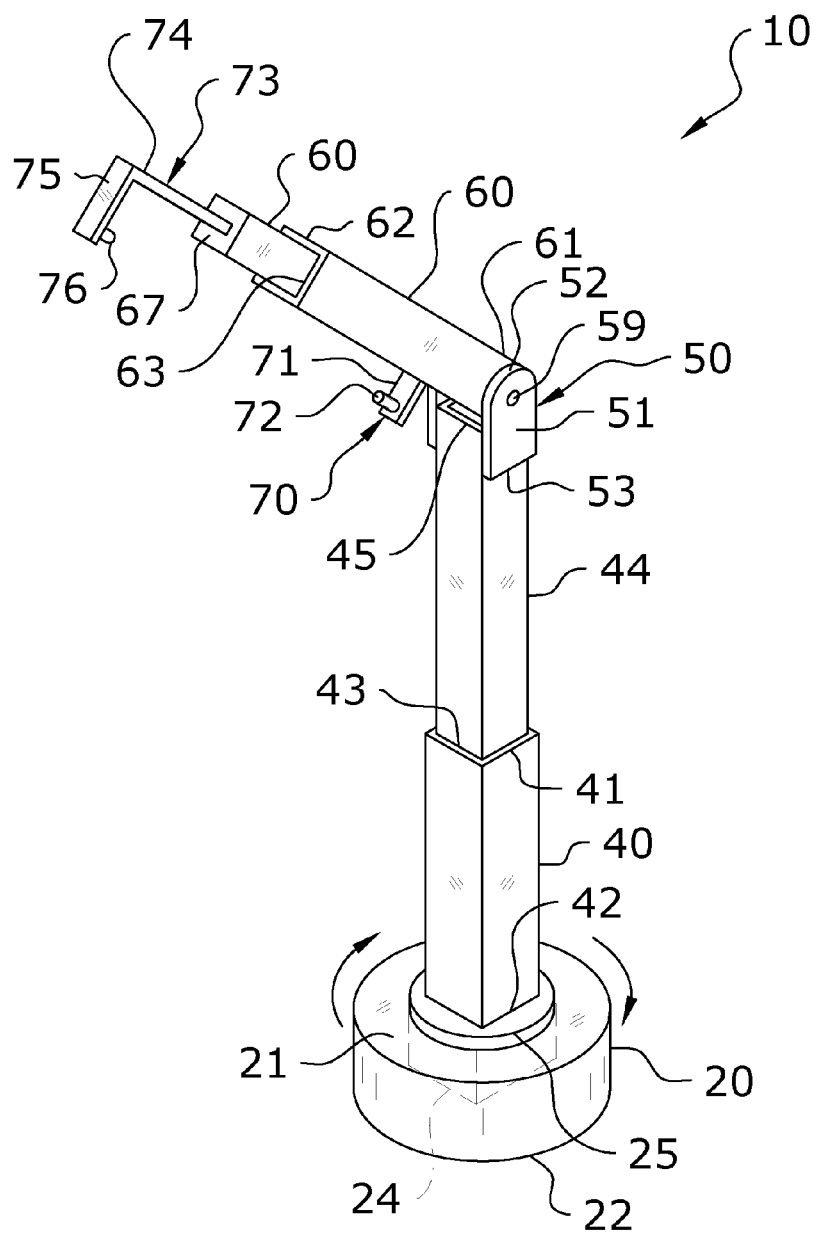
FIG. 9 is a frontal upper perspective view of the present invention in a diagonal configuration.

With the sheet 84 extended, the present invention is ready for use. The second receiver 60 may be adjusted along a longitudinal axis into a number of angles with respect the first linkage 44. For example, the second receiver 60 may be adjusted to be vertical, horizontal, or at an angle (such as a 45 degree angle) with respect to the first linkage 44 such as shown in FIG. 8.

The motor 24 may be activated to cause the first receiver 40 to rotate with respect to the base 20. The motor 24 may be configured to allow for full rotations, partial rotations, or oscillations of set degree ranges. In any case, the action of the sheet 84 will deter nuisances such as insects from remaining in the area.

When use of the present invention has concluded, the sheet roller 80 may be removed and stored on the retainer pin 28 of the base 20. The second linkage 65 may be drawn into the second receiver 60 and the first linkage 44 may be drawn into the first receiver 40. FIG. 3 illustrates an exemplary storage position for the present invention.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A repellant system, comprising:
   a base;
   a first receiver extending from said base, wherein said first receiver includes an adjustable first linkage extending therefrom;
   a second receiver rotatably connected to said first linkage, wherein said second receiver includes an adjustable second linkage extending therefrom;
   a first mount on said second receiver;
   a second mount on said second linkage; and
   a sheet roller removably connected between said first mount and said second mount.

2. The repellant system of claim 1, wherein said base includes a rotatable platform.

3. The repellant system of claim 2, wherein a lower end of said first receiver is secured to said rotatable platform.

4. The repellant system of claim 2, further comprising a motor for rotating said rotatable platform.

5. The repellant system of claim 4, wherein said motor is positioned within said base.

6. The repellant system of claim 4, wherein said motor is adjustable between a full rotation mode, a partial rotation mode, and an oscillation mode.

7. The repellant system of claim 1, wherein said base includes a retainer pin, wherein said sheet roller is adapted to be removably secured to said retainer pin when not in use.

8. The repellant system of claim 1, wherein said base is comprised of a weighted base.

9. The repellant system of claim 1, wherein said base includes a clamp extending therefrom for removably securing said base to a surface.

10. The repellant system of claim 9, wherein said clamp includes a first member and a second member, wherein said first member is positioned above said surface and wherein said second member is positioned beneath said surface.

11. The repellant system of claim 10, further comprising a knob for adjusting said clamp.

12. The repellant system of claim 1, further comprising an adjustment connector for rotatably connecting said second receiver with said first linkage.

13. The repellant system of claim 12, wherein said adjustment connector includes a first connector secured to a first side of an upper end of said first linkage and a second connector secured to a second side of said upper end of said first linkage.

14. The repellant system of claim 13, wherein a first end of said second receiver is rotatably secured between said first connector and said second connector by an adjustment pin.

15. A repellant system, comprising:
   a base;
   a rotatable platform on said base;
   a first receiver extending from said rotatable platform, wherein said first receiver includes a first channel;
   a first linkage adjustably secured within said first channel;
   a second receiver, wherein said second receiver includes a second channel;
   a second linkage adjustably secured within said second channel;
   an adjustment connector secured between said first linkage and said second receiver, wherein said second receiver is adjustable into a plurality of angles with respect to said first linkage;
   a first mount on said second receiver;
   a second mount on said second linkage; and
   a sheet roller removably connected between said first mount and said second mount.

16. The repellant system of claim 15, further comprising a clamp extending from said base.

17. The repellant system of claim 15, further comprising a motor for rotating said platform.

18. The repellant system of claim 15, wherein said first mount comprises a first base and a first pin extending from said first base.

19. The repellant system of claim 18, wherein said second mount comprising a horizontal portion, a vertical portion, and a second pin extending from said vertical portion.

20. The repellant system of claim 15, wherein said sheet roller comprises a roller tube and a sheet wound around said roller tube, wherein said sheet includes a plurality of sheet apertures.

\* \* \* \* \*